US012462736B2

United States Patent

(12) United States Patent
You et al.

(10) Patent No.: US 12,462,736 B2
(45) Date of Patent: Nov. 4, 2025

(54) DISPLAY DEVICE AND DRIVING METHOD THEREOF

(71) Applicant: Samsung Display Co., LTD., Yongin-si (KR)

(72) Inventors: Jin Young You, Yongin-si (KR); Kyung Ho Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/735,921

(22) Filed: Jun. 6, 2024

(65) Prior Publication Data

US 2025/0029548 A1 Jan. 23, 2025

(30) Foreign Application Priority Data

Jul. 21, 2023 (KR) ........................ 10-2023-0095400

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2310/0275* (2013.01); *G09G 2310/08* (2013.01); *G09G 2320/02* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 8,780,568 B2 | 7/2014 | Osako et al. | |
| 2022/0358881 A1* | 11/2022 | Chae .................... | G09G 3/3266 |
| 2023/0070352 A1* | 3/2023 | Hwang ................ | G09G 3/2011 |

FOREIGN PATENT DOCUMENTS

| | | | |
|---|---|---|---|
| KR | 102199338 B1 | 1/2021 |
| KR | 102218375 B1 | 2/2021 |
| KR | 20220151088 A | 11/2022 |
| KR | 20230037104 A | 3/2023 |

* cited by examiner

*Primary Examiner* — Christopher J Kohlman
(74) *Attorney, Agent, or Firm* — CANTOR COLBURN LLP

(57) ABSTRACT

A display device includes a display panel including a display area including sub-pixels, a data driver providing a data voltage to each of the sub-pixels through a data line, a gate driver providing a bias gate signal to each of the sub-pixels and a driving controller compensating for the data voltage written in a second area to which the bias gate signal having an activation level in a first period in which the data voltage is written in the first area is applied based on a first data voltage corresponding to a grayscale of a first area of the display area and a second data voltage corresponding to a grayscale of a different area from the first area of the display area.

20 Claims, 13 Drawing Sheets

DISPLAY DEVICE AND DRIVING METHOD THEREOF

This application claims priority to Korean Patent Application No. 10-2023-0095400, filed on Jul. 21, 2023, and all the benefits accruing therefrom under 35 U.S.C. § 119, the content of which in its entirety is herein incorporated by reference.

BACKGROUND

1. Field

The invention generally relates to a display device, and more particularly to a display device and a driving method thereof.

2. Description of the Related Art

A display device may include a display panel including a plurality of sub-pixels and a display panel driver driving the display panel. The display panel driver may display an image on the display panel using input image data received from an external processor. The processor may generate input image data by rendering raw data, and a rendering time for generating input image data corresponding to one frame may vary depending on a type or characteristic of an image. The display panel driver may change a driving frequency in response to the rendering time.

When the display device is driven at a low driving frequency, one frame may include an active period in which a data voltage is written and a blank period in which no data voltage is written. During the blank period, luminance of the display device may increase compared to the active period due to a leakage current and/or hysteresis characteristics of a driving transistor. To improve this, the display device may supply a bias voltage to the driving transistor in each of the active period and the blank period.

One pixel row may be connected to the same data line. In addition, when the data voltage rapidly changes, it may affect other pixel rows in which the data voltage is not written. As a result, mura may occur in a partial area of the display panel.

SUMMARY

Embodiments provide a display device that minimizes mura.

Embodiments further provide a driving method of a display device that drives the display device.

An embodiment provides a display device including a display panel including a display area including sub-pixels, a data driver providing a data voltage to each of the sub-pixels through a data line, a gate driver providing a bias gate signal to each of the sub-pixels and a driving controller compensating for the data voltage written in a second area to which the bias gate signal having an activation level in a first period in which the data voltage is written in the first area is applied based on a first data voltage corresponding to a grayscale of a first area of the display area and a second data voltage corresponding to a grayscale of a different area from the first area of the display area.

In an embodiment, a difference between the grayscale of the first area and the grayscale of a different area from the first area may be greater than a reference grayscale.

In an embodiment, the driving controller may compensate for the data voltage written in the second area based on a difference between the first data voltage and the second data voltage.

In an embodiment, the driving controller may determine a compensation voltage by applying a weight to the difference between the first data voltage and the second data voltage, and may compensate for the data voltage written in the second area based on the compensation voltage.

In an embodiment, each of the sub-pixels may include a light emitting element, and the weight may be determined based on a capacitance between an anode electrode of the light emitting element and the data line and an internal capacitance of the light emitting element.

In an embodiment, the weight may increase as the capacitance between the anode electrode of the light emitting element and the data line increases, and may decrease as the internal capacitance of the light emitting element increases.

In an embodiment, each of the sub-pixels may include a driving transistor and a storage capacitor, and the weight may be determined based on a capacitance between a first electrode of the driving transistor and the data line and a capacitance of the storage capacitor.

In an embodiment, the weight may increase as the capacitance between the first electrode of the driving transistor and the data line increases, and may decrease as the capacitance of the storage capacitor increases.

In an embodiment, the weight may increase as a driving frequency of the display panel increases.

In an embodiment, the display device may further include an emission driver providing an emission signal to each of the sub-pixels, wherein the weight may increase as an off duty ratio of the emission signal increases.

In an embodiment, the driving controller may compensate for the data voltage written in the second area by adding a compensation grayscale corresponding to the compensation voltage to a grayscale of the second area.

In an embodiment, the driving controller may compensate for the data voltage written in a third area that is different from the second area and to which the bias gate signal having the activation level in the first period is applied.

In an embodiment, the driving controller may generate a first compensation voltage by applying a first weight to a difference between the first data voltage and the second data voltage, compensate for the data voltage written in the second area based on the first compensation voltage, generate a second compensation voltage by applying a second weight to the difference between the first data voltage and the second data voltage, and compensate for the data voltage written in the third area based on the second compensation voltage.

In an embodiment, the second area may be closer to the first area than the third area, and the first compensation voltage may be greater than the second compensation voltage.

Another embodiment provides a driving method of a display device, including calculating a grayscale of a first area of a display area and a grayscale of a different area from the first area of the display area based on an input image data, determining a first data voltage based on the grayscale of the first area, determining a second data voltage based on the grayscale of the different area from the first area and compensating for the data voltage written in a second area to which a bias gate signal having an activation level in a first period in which a data voltage is written in the first area is applied based on the first data voltage and the second data voltage.

In an embodiment, the first data voltage and the second data voltage may be determined based on a lookup table including the data voltage according to a grayscale.

In an embodiment, a difference between the grayscale of the first area and the grayscale of the different area from the first area may be greater than a reference grayscale.

In an embodiment, the data voltage written in the second area may be compensated based on a difference between the first data voltage and the second data voltage.

In an embodiment, the compensating of the data voltage written in the second area may include determining a compensation voltage by applying a weight to the difference between the first data voltage and the second data voltage and compensating for the data voltage written in the second area based on the compensation voltage.

In an embodiment, the data voltage written in the second area may be compensated by adding a compensation grayscale corresponding to the compensation voltage to the grayscale of the second area.

The display device according to embodiments may minimize mura by compensating for a data voltage in an area in which the mura occurs due to an area in which a grayscale change occurs.

Additionally, the scope of the invention is not limited to the above-described embodiments.

DETAILED DESCRIPTION

Figure 1:
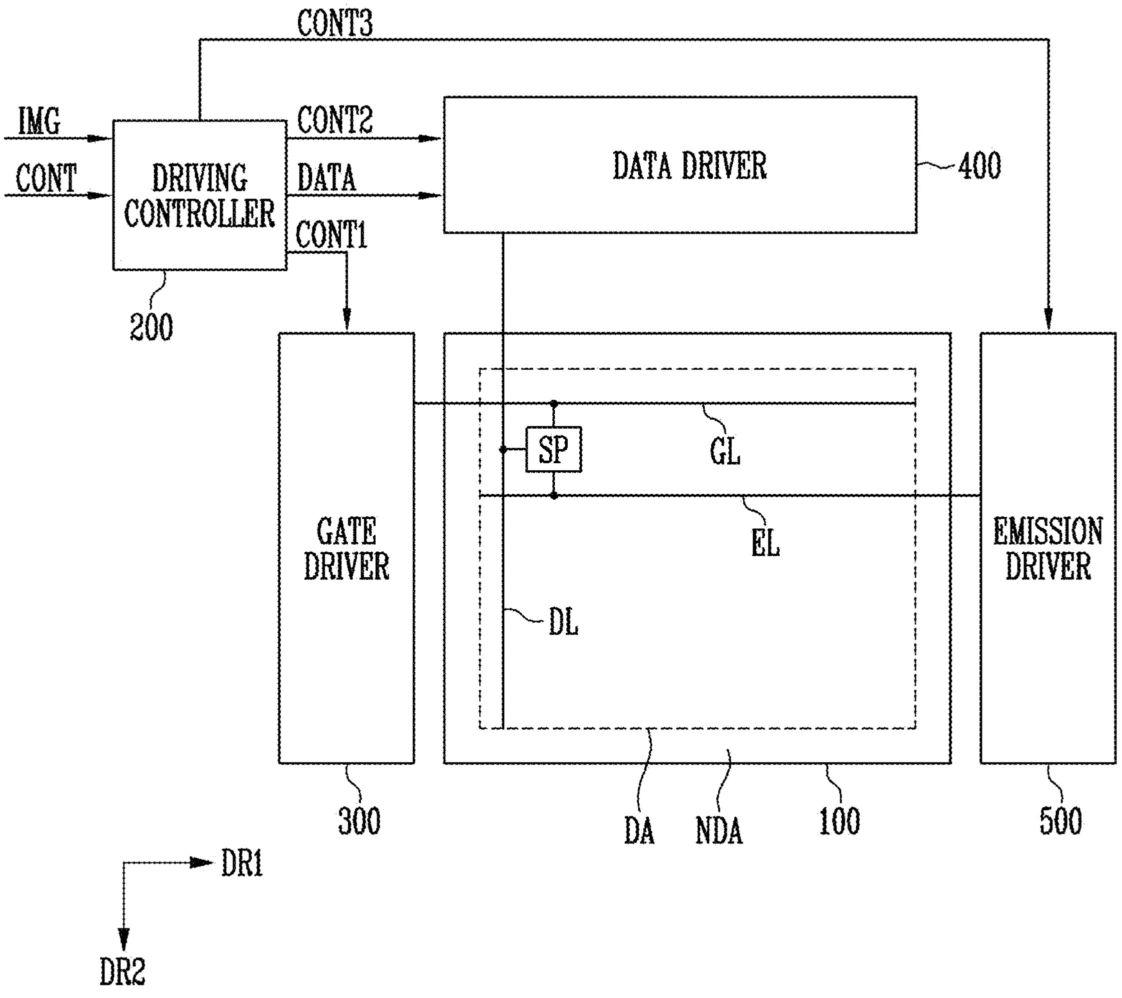
FIG. 1 illustrates a schematic block diagram of a display device, according to an embodiment.

Hereinafter, embodiments of the invention will be described in detail with reference to the accompanying drawings. The following description is intended to provide a sufficient disclosure to enable the understanding of the invention. In addition, the invention may be embodied in different forms and is not limited to the embodiments set forth herein. The embodiments described herein are provided for the purpose of describing the invention in sufficient detail for those skilled in the art to easily practice the invention.

Throughout the specification, when it is described that an element is "connected" to another element, this includes not only being "directly connected", but also being "indirectly connected" with another device in between. The terms used herein are for the purpose of describing specific embodiments and are not intended to limit the scope of the invention. Throughout the specification, unless explicitly described to the contrary, the word "comprise" and variations such as "comprises" or "comprising" will be understood to imply the inclusion of stated elements but not the exclusion of any other elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms first, second, etc. may be used herein to describe various constituent elements, these constituent elements should not be limited by these terms. These terms are used to distinguish one constituent element from another constituent element. Thus, a first constituent element discussed below could be termed a second constituent element without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated about 90 degrees or at other orientations), and, as such, the spatially relative descriptors used herein interpreted accordingly.

Various embodiments may be described herein with reference to sectional illustrations that are schematic illustrations of idealized embodiments. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the invention.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

Hereinafter, embodiments of the invention will be described in detail with reference to the accompanying drawings.

FIG. 1 illustrates a schematic block diagram of a display device, according to an embodiment.

Referring to FIG. 1, the display device may include a display panel 100, a driving controller 200, a gate driver 300, a data driver 400, and an emission driver 500. In an embodiment, the driving controller 200 and data driver 400 may be integrated on a single chip.

In an embodiment, the display panel 100 may include a display area DA displaying an image and a non-display area NDA disposed adjacent to the display area DA. In an embodiment, the gate driver 300 and the emission driver 500 may be mounted in the non-display area NDA.

In an embodiment, the display panel 100 may include a plurality of gate lines GL, a plurality of data lines DL, a plurality of emission lines EL, and a plurality of sub-pixels SP electrically connected to the gate lines GL, the data lines DL, and the emission lines EL. The gate lines GL and the emission lines EL may be extended in a first direction DR1, and the data lines DL may be extended in a second direction DR2 crossing the first direction DR1.

In an embodiment, the driving controller 200 may receive input image data IMG and an input control signal CONT from a main processor (for example, a graphic processing unit (GPU) and the like). For example, the input image data IMG may include red image data, green image data, and blue image data. In an embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

In an embodiment, the driving controller 200 may generate a first control signal CONT1, a second control signal CONT2, a third control signal CONT3, and a data signal DATA based on the input image data IMG and the input control signal CONT.

In an embodiment, the driving controller 200 may generate the first control signal CONT1 for controlling the operation of the gate driver 300 based on the input control signal CONT to output it to the gate driver 300. The first control signal CONT1 may include a vertical start signal and a gate clock signal.

In an embodiment, the driving controller 200 may generate the second control signal CONT2 for controlling the operation of the data driver 400 based on the input control signal CONT to output it to the data driver 400. The second control signal CONT2 may include a horizontal start signal and a load signal.

In an embodiment, the driving controller 200 may receive the input image data IMG and the input control signal CONT to generate the data signal DATA. The driving controller 200 may output the data signal DATA to the data driver 400.

In an embodiment, the driving controller 200 may generate the third control signal CONT3 for controlling the operation of the emission driver 500 based on the input control signal CONT to output it to the emission driver 500. The third control signal CONT3 may include a vertical start signal and an emission clock signal.

In an embodiment, the gate driver 300 may generate gate signals for driving the gate lines GL in response to the first control signal CONT1 received from the driving controller 200. The gate driver 300 may output the gate signals to the gate lines GL. For example, the gate driver 300 may sequentially output the gate signals to the gate lines GL.

In an embodiment, the data driver 400 may receive the second control signal CONT2 and the data signal DATA from the driving controller 200. The data driver 400 may generate data voltages obtained by converting the data signal DATA into an analog voltage. The data driver 400 may output the data voltages to the data line DL.

In an embodiment, the emission driver 500 may generate emission signals for driving the emission lines EL in response to the third control signal CONT3 received from the driving controller 200. The emission driver 500 may output the emission signals to the emission lines EL. For example, the emission driver 500 may sequentially output the emission signals to the emission lines EL.

Figure 2:
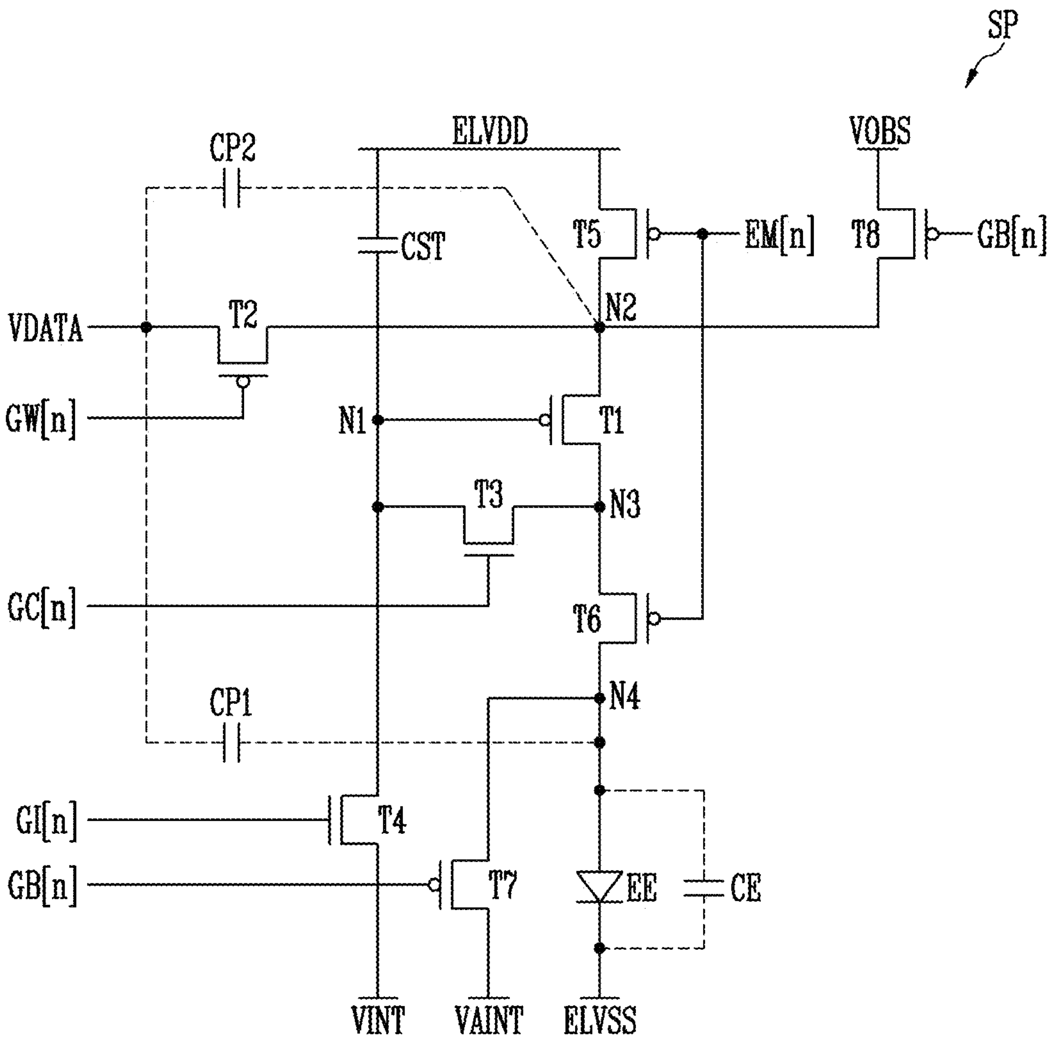
FIG. 2 illustrates a schematic circuit diagram of an example of a sub-pixel of the display device of FIG. 1, according to an embodiment.

FIG. 2 illustrates a schematic circuit diagram of an example of a sub-pixel of the display device of FIG. 1, according to an embodiment.

In an embodiment and referring to FIG. 1 and FIG. 2, each of the sub-pixels SP may include a first transistor T1 (that is, a driving transistor) including a control electrode connected to a first node N1, a first electrode connected to a second node N2, and a second electrode connected to a third node N3, a second transistor T2 including a control electrode receiving a write gate signal GW[n], a first electrode receiving a data voltage VDATA, and a second electrode connected to the second node N2, a third transistor T3 including a control electrode receiving a compensation gate signal GC[n], a first electrode connected to the third node N3, and a second electrode connected to the first node N1, a fourth transistor T4 including a control electrode receiving an initialization gate signal GI[n], a first electrode receiving a first initialization voltage VINT, and a second electrode connected to the first node N1, a fifth transistor T5 including a control electrode receiving an emission signal EM[n], a first electrode receiving a first power supply voltage ELVDD (for example, a high power voltage), and a second electrode connected to the second node N2, a sixth transistor T6 including a control electrode receiving the emission signal EM[n], a first electrode connected to the third node N3, and a second electrode connected to a fourth node N4, a seventh transistor T7 including a control electrode receiving a bias gate signal GB[n], a first electrode receiving a second initialization voltage VAINT, and a second electrode connected to the fourth node N4, an eighth transistor T8 including a control electrode receiving a bias gate signal GB[n], a first electrode receiving a bias voltage VOBS, and a second electrode connected to the second node N2, a storage capacitor CST including a first electrode receiving the first power voltage ELVDD and a second electrode connected to the first node N1 and a light emitting element EE including a first electrode (that is, an anode electrode) connected to the fourth node N4 and a second electrode receiving a second power voltage ELVSS (for example, a low power voltage). However, the invention is not limited to the sub-pixel structure.

In an embodiment, a first parasitic capacitor CP1 may be formed between the data line DL and the first electrode (that is, the anode electrode) of the light emitting element EE. In addition, a second parasitic capacitor CP2 may be formed between the data line DL and the first electrode of the first transistor T1 (that is, the driving transistor).

In an embodiment, the first transistor T1, second transistor T2, fifth transistor T5, sixth transistor T6, seventh transistor T7 and eighth transistor T8 may be implemented as p-channel metal oxide semiconductor (PMOS) transistors. In this embodiment, the low voltage level may be an activation level, and the high voltage level may be an inactivation level. For example, when a signal applied to the control electrode of the PMOS transistor has a low voltage level, the PMOS transistor may be turned on. In another example, when a signal applied to the control electrode of the PMOS transistor has a high voltage level, the PMOS transistor may be turned off.

In an embodiment, the third transistor T3 and fourth transistor T4 may be implemented as n-channel metal oxide semiconductor (NMOS) transistors. In this embodiment, the low voltage level may be an inactivation level, and the high voltage level may be an activation level. For example, when a signal applied to the control electrode of the NMOS transistor has a low voltage level, the NMOS transistor may be turned off. In another example, when a signal applied to the control electrode of the NMOS transistor has a high voltage level, the NMOS transistor may be turned on. That is, the activation level and the inactivation level may be determined according to the type of transistor.

However, the invention is not limited thereto. For example, the first transistor T1, second transistor T2, fifth transistor T5, sixth transistor T6, seventh transistor T7 and eighth transistor T8 may be implemented as NMOS transistors. For example, the third transistor T3 and fourth transistor T4 may be implemented as PMOS transistors.

Figure 3:
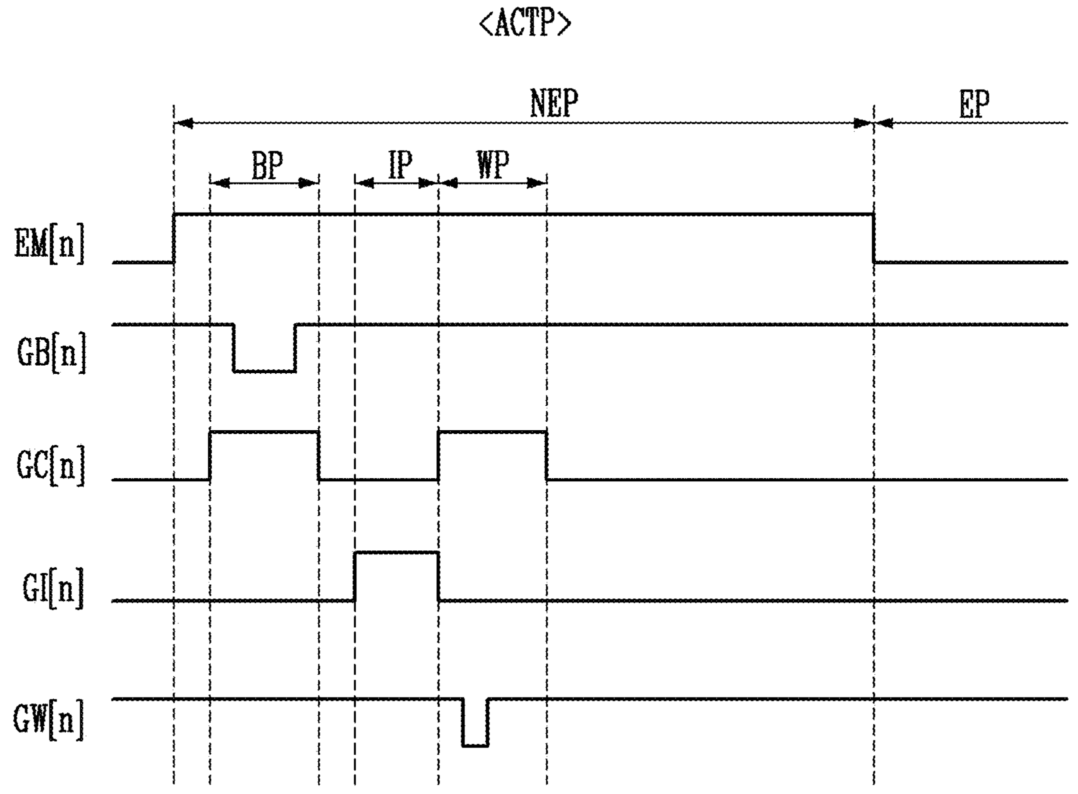
FIG. 3 illustrates a timing diagram of an example in which the sub-pixel of FIG. 2 is driven in an active period, according to an embodiment.
Figure 4:
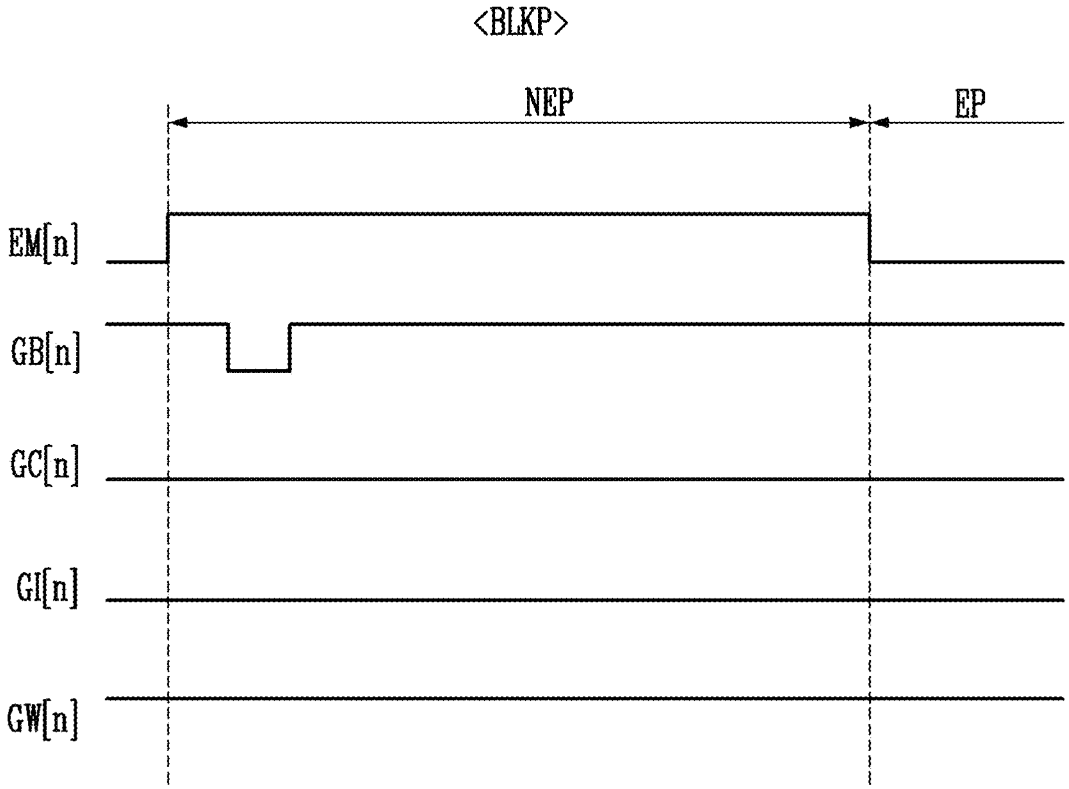
FIG. 4 illustrates a timing diagram of an example in which the sub-pixel of FIG. 2 is driven in a blank period, according to an embodiment.

FIG. 3 illustrates a timing diagram of an example in which the sub-pixel of FIG. 2 is driven in an active period, according to an embodiment, and FIG. 4 illustrates a timing diagram of an example in which the sub-pixel of FIG. 2 is driven in a blank period, according to an embodiment.

In an embodiment and referring to FIG. 2 and FIG. 3, an active period ACTP may include an emission period EP and a non-emission period NEP. The non-emission period NEP of the active period ACTP may include a bias period BP, an initialization period IP, and a data write period WP.

In an embodiment, in the bias period BP, the bias gate signal GB[n] and the compensation gate signal GC[n] have activation levels, and the third transistor T3, the seventh transistor T7, and the eighth transistor T8 may be turned on. Accordingly, the second initialization voltage VAINT (that is, the anode initialization voltage) may be applied to the first electrode (that is, the anode electrode) of the light emitting element EE. That is, the internal capacitor CE of the light emitting element EE may be initialized. In addition, the bias voltage VOBS may be transmitted to the first node N1 through the second node N2. Accordingly, a voltage difference between the first node N1 and the third node N3 of the first transistor T1 may be reduced to a threshold voltage level of the first transistor T1 and the bias of the first transistor T1 may be initialized.

In an embodiment, in the initialization period IP, the initialization gate signal GI[n] may have an activation level and the fourth transistor T4 may be turned on. Accordingly, the first initialization voltage VINT may be applied to the first node N1. That is, the control electrode (that is, the storage capacitor CST) of the first transistor T1 may be initialized.

In an embodiment, in the data write period WP, the write gate signal GW[n] and the compensation gate signal GC[n] have activation levels, and the second transistor T2 and the third transistor T3 may be turned on. Accordingly, the data voltage VDATA may be written to the storage capacitor CST.

In an embodiment, in the emission period EP, the emission signal EM[n] has an activation level, and the fifth transistor T5 and the sixth transistor T6 may be turned on. Accordingly, the first power voltage ELVDD is applied to the first transistor T1 to generate a driving current, and the driving current may be applied to the light emitting element EE. That is, the light emitting element EE may emit light with luminance corresponding to the driving current.

In an embodiment and referring to FIG. 2 and FIG. 4, the blank period BLKP may include a non-emission period NEP and an emission period EP. In the non-emission period NEP of the blank period BLKP, the compensation gate signal GC[n], the initialization gate signal GI[n], and the write gate signal GW[n] may have inactivation levels. That is, the data voltage VDATA may not be written in the blank period BLKP.

Figure 5:
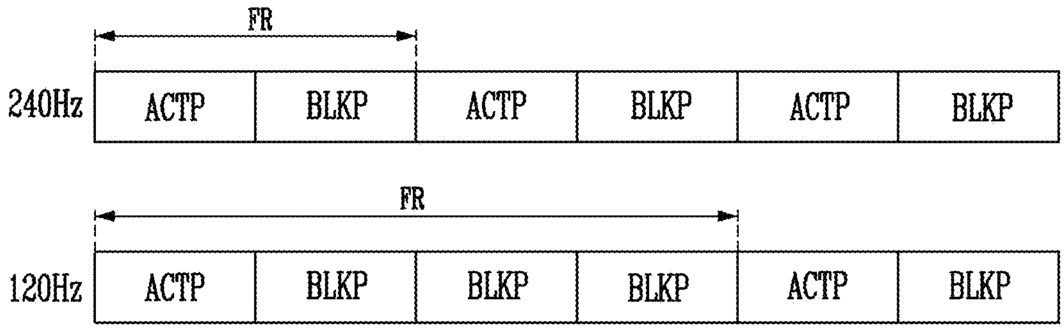
FIG. 5 illustrates a timing diagram of an example in which a driving frequency of the display device of FIG. 1 is varied, according to an embodiment.

FIG. 5 illustrates an example in which a driving frequency of the display device of FIG. 1 is varied, according to an embodiment.

In an embodiment and referring to FIG. 5, one frame FR may include sub-frames ACTP and BLKP. Here, the sub-frame means one active period ACTP or one blank period BLKP. A data voltage may be written in the active period ACTP of one frame FR. A data voltage may not be written in the blank period BLKP of one frame FR. The display device may change the driving frequency of the display panel by adjusting the number of repetitions of the blank period BLKP.

In an embodiment, when the driving frequency is 240 Hz, one frame FR may include one active period ACTP and one blank period BLKP. In an embodiment, when the driving frequency is 120 Hz, one frame FR may include one active period ACTP and three blank periods BLKP. In an embodiment, although not shown in FIG. 5, when the driving frequency is 480 Hz, one frame FR may include one active period ACTP.

Figure 6:
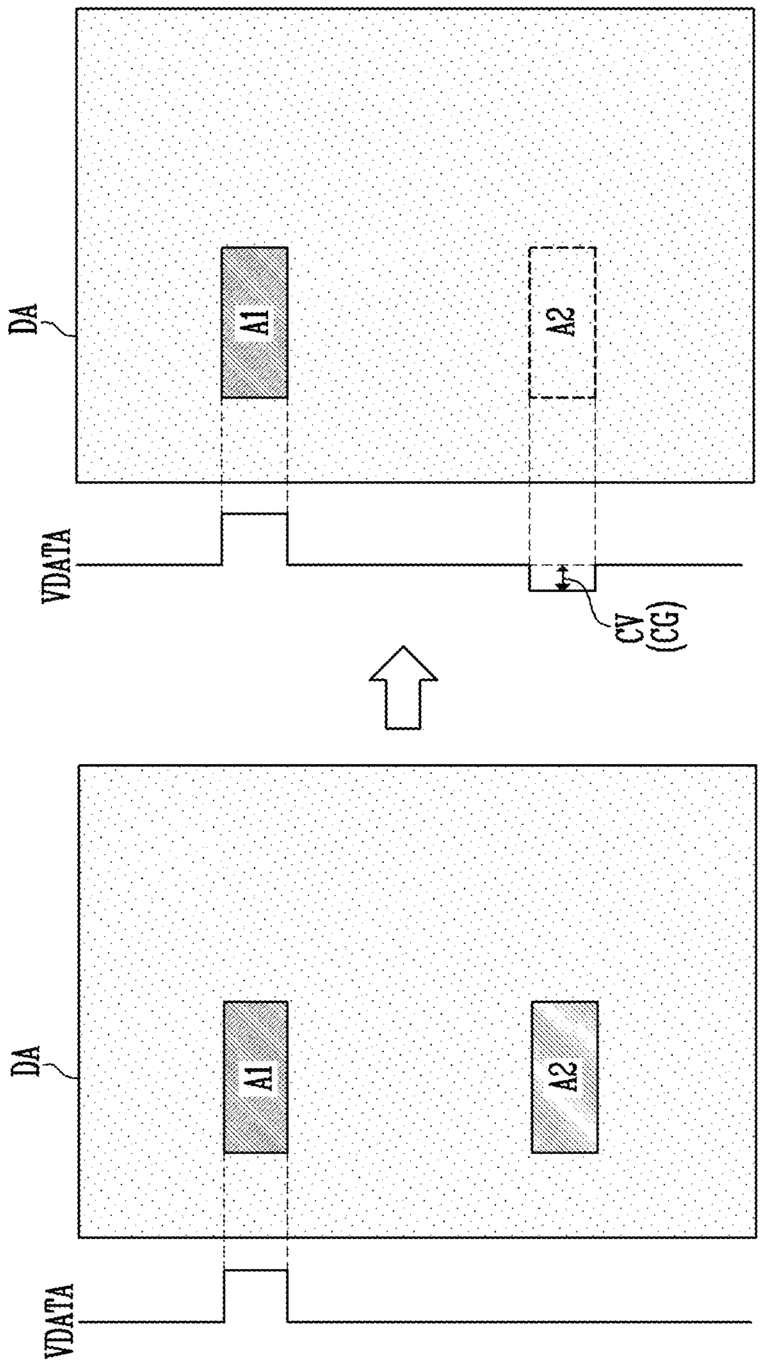
FIG. 6 illustrates a timing diagram of an example in which the display device of FIG. 1 compensates for a second area, according to an embodiment.
Figure 7:
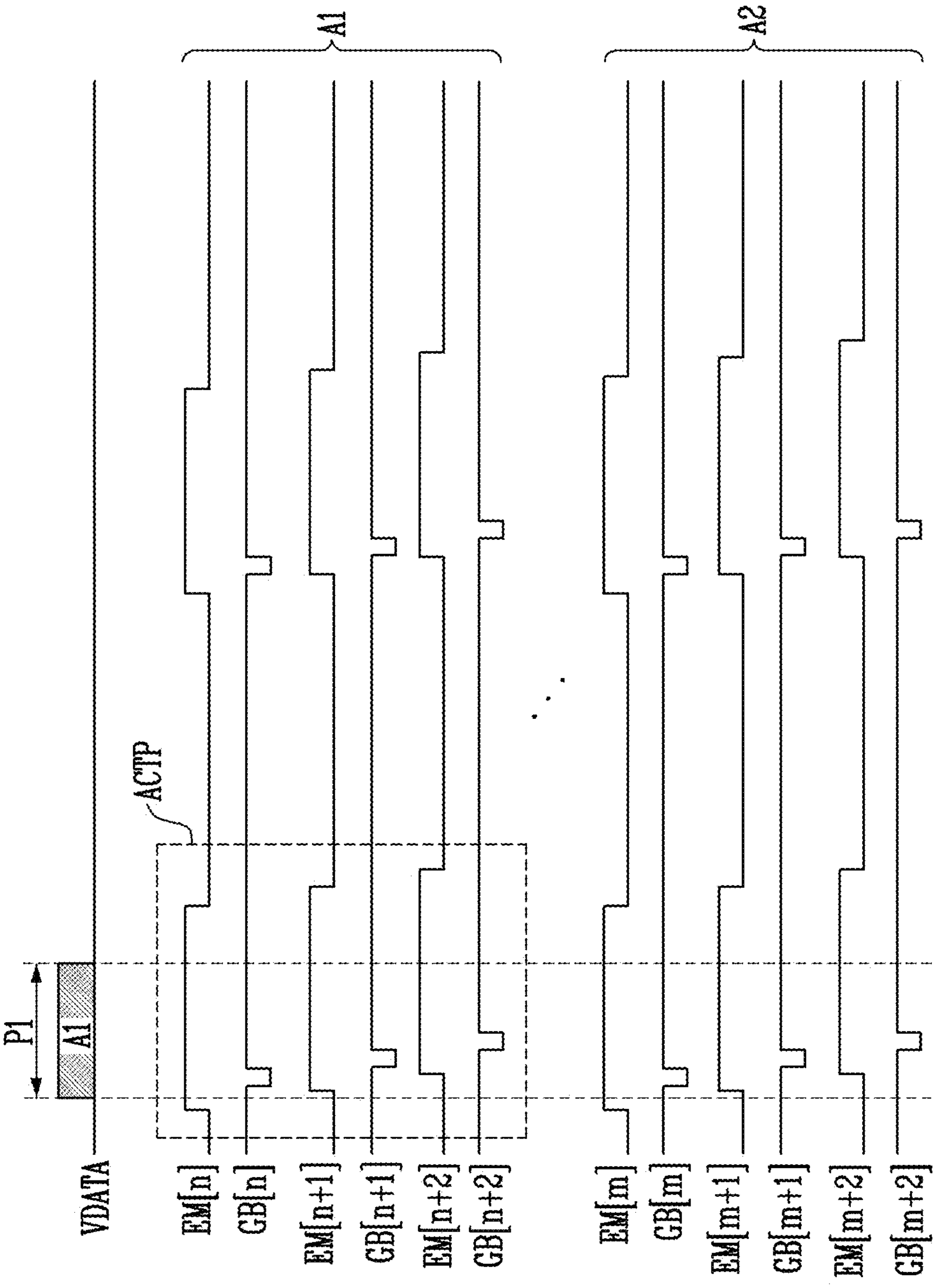
FIG. 7 illustrates a timing diagram of an example in which the display device of FIG. 1 drives the display panel in two cycles, according to an embodiment.
Figure 8:
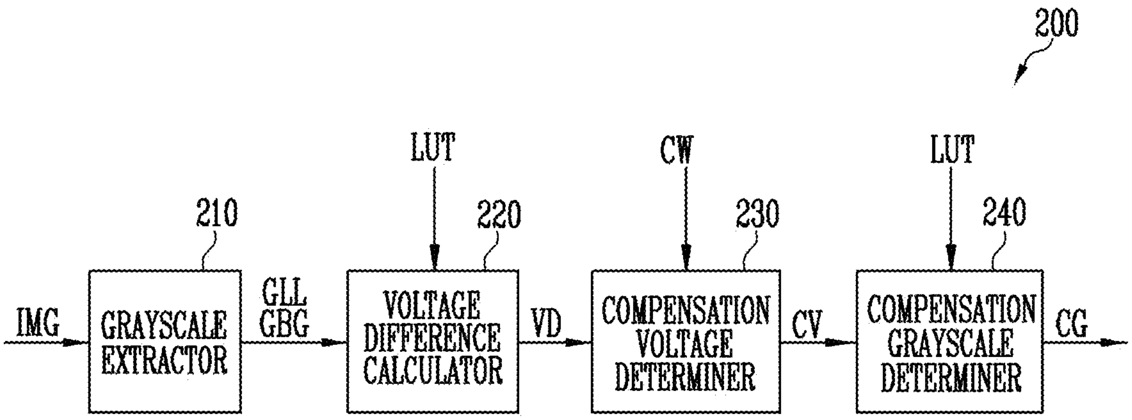
FIG. 8 illustrates a block diagram of an example of a driving controller of the display device of FIG. 1, according to an embodiment.

FIG. 6 illustrates an example in which the display device of FIG. 1 compensates for a second area according to an embodiment, FIG. 7 illustrates a timing diagram of an example in which the display device of FIG. 1 drives the display panel in two cycles according to an embodiment, and FIG. 8 illustrates a block diagram of an example of a driving controller of the display device of FIG. 1, according to an embodiment.

In an embodiment, the left display area DA of FIG. 6 represents a case in which the data voltage VDATA is not compensated, and the right display area DA of FIG. 6 represents a case in which the data voltage VDATA is compensated.

In an embodiment, t, FIG. 7 illustrates that a first area A1 includes sub-pixels of n-th, (n+1)-th, and (n+2)-th pixel rows and that a second area A2 includes sub-pixels of m-th, (m+1)-th, and (m+2)-th pixel rows. Here, n is a positive integer, and m is a positive integer greater than n.

In an embodiment and referring to FIG. 6 and FIG. 7, the driving controller 200 may compensate for the data voltage VDATA written to the second area A2 to which a bias gate signal (for example, GB[m], GB[m+1], and GB[m+2]) having an activation level in the first period P1 in which the data voltage VDATA is written to the first area A1 is applied, based on a first data voltage corresponding to a grayscale of the first area A1 of the display area DA and a second data voltage corresponding to a grayscale of an different area from the first area A1 of the display area DA.

In an embodiment, a difference between the grayscale of the first area A1 and the grayscale of a different area from the first area A1 may be greater than a reference grayscale. The reference grayscale may have a predetermined value. For example, a grayscale difference between the first area A1 and an area located adjacent to the first area A1 may be greater than the reference grayscale. That is, the first area A1 may be an area having a large grayscale difference from the adjacent area.

For example, in an embodiment and as shown in FIG. 2, when the first transistor T1 is a PMOS transistor, the lower the grayscale, the larger the data voltage VDATA corresponding to the grayscale. For convenience of description, as shown in FIG. 6, it is assumed that the grayscale of the first area A1 is lower than that of a different area from the first area A1. In this case, the data voltage VDATA may decrease at an end portion of the first area A1. In addition, as the data voltage VDATA decreases, the voltage of the first electrode (that is, the anode electrode) of the light emitting element EE may decrease due to coupling and due to the first parasitic capacitor CP1. In addition, after the voltage of the first electrode (that is, the anode electrode) of the light emitting element EE decreases, luminance of an area (for example, the second area A2) without the bias period may decrease. Accordingly, the driving controller 200 may compensate for the decrease in luminance by compensating for the data voltage VDATA written in the area in which the luminance decreases.

In an embodiment, when the display device drives the display panel in 2 cycles, an area in which one luminance decreases may occur. Here, 2 cycle driving means that two areas of the display area DA display different sub-frames. In this case, the deactivation timing of the bias gate signals (GB[n], GB[n+1], GB[n+2], . . . , GB[m], GB[m+1], GB[m+2]) and the inactivation timing of the emission signals (GB[n], GB[n+1], GB[n+2], . . . , GB[m], GB[m+1], GB[m+2]) may overlap the two areas.

In an embodiment and referring to FIG. 2 and FIG. 6 to FIG. 8, the driving controller 200 may include a grayscale extractor 210, a voltage difference calculator 220, a compensation voltage determiner 230, and a compensation grayscale determiner 240.

In an embodiment, the grayscale extractor 210 may calculate a grayscale GLL of the first area A1 and a grayscale GBG of a different area from the first area A1 based on an input image data IMG. In an embodiment, it is illustrated that the grayscale GLL of the first area A1 and the grayscale GBG of areas other than the first area A1 are constant, but the invention is not limited thereto. For example, the driving controller 200 may compensate for the data voltage VDATA written in the second area A2, based on a first data voltage corresponding to an average value of the grayscales GLL in the first area A1 and a second data voltage corresponding to an average value of the grayscales GBG in a different area from the first area A1.

In an embodiment, the driving controller 200 may include a frame buffer or a line buffer. The driving controller 200 may store input image data of one frame or input image data of a pixel row in a frame buffer or a line buffer.

In an embodiment, the voltage difference calculator 220 may determine the first data voltage and the second data voltage based on the grayscale GLL of the first area A1 and the grayscale GBG of areas other than the first area A1. In addition, the voltage difference calculator 220 may calculate a difference VD between the first data voltage and the second data voltage.

In an embodiment, the first data voltage and the second data voltage may be determined based on a lookup table LUT including the data voltages VDATA according to grayscales. For example, the voltage difference calculator 220 may determine the data voltage VDATA corresponding to the grayscale GLL of the first area A1 as the first data voltage by using the lookup table LUT. For example, the voltage difference calculator 220 may determine the data voltage VDATA corresponding to the grayscale GBG of the area other than the first area A1 as the second data voltage by using the lookup table LUT.

In an embodiment, the compensation voltage determiner 230 may determine a compensation voltage CV based on the difference VD between the first data voltage and the second data voltage. The compensation voltage determiner 230 may determine the compensation voltage CV by applying a capacitance weight CW to the difference VD between the first data voltage and the second data voltage. For example, the compensation voltage CV may be a product of the difference VD between the first data voltage and the second data voltage and the capacitance weight CW.

In an embodiment, the capacitance weight CW may be determined based on capacitance (that is, the capacitance of the first parasitic capacitor CP1) between the first electrode (that is, the anode electrode) of the light emitting element EE and the data line DL and internal capacitance of the light emitting element EE (that is, capacitance of the internal capacitor CE of the light emitting element EE). For example, the capacitance weight CW may increase as the capacitance between the first electrode of the light emitting element EE and the data line DL increases, and may decrease as the internal capacitance of the light emitting element EE increases. For example, the capacitance weight CW may be a value obtained by dividing the capacitance between the first electrode of the light emitting element EE and the data line DL by the internal capacitance of the light emitting element EE. Here, the capacitance between the first electrode of the light emitting element EE and the data line DL and the internal capacitance of the light emitting element EE may be experimentally determined.

In an embodiment, the capacitance weight CW may be determined based on the capacitance (that is, the capacitance of the second parasitic capacitor CP2) between the first electrode of the first transistor T1 (that is, the driving transistor) and the data line DL and the capacitance of the storage capacitor CST. For example, the capacitance weight CW may increase as the capacitance between the first electrode of the first transistor T1 and the data line DL increases, and may decrease as the capacitance of the storage capacitor CST increases. For example, the capacitance weight CW may be a value obtained by dividing the capacitance between the first electrode of the first transistor T1 and the data line DL by the sum of the capacitance of the storage capacitor CST and the capacitance of the first electrode of the first transistor T1 excluding the capacitance between the first electrode of the first transistor T1 and the data line DL. Here, the capacitance between the first electrode of the first transistor T1 and the data line DL, the capacitance of the storage capacitor CST, and the capacitance of the first electrode of the first transistor T1 excluding the capacitance between the first electrode of the first transistor T1 and the data line DL may be experimentally determined.

In an embodiment, the compensation grayscale determiner 240 may determine a compensation grayscale CG based on the compensation voltage CV. For example, the compensation grayscale determiner 240 may determine a grayscale corresponding to the compensation voltage CV as the compensation grayscale CG by using the lookup table LUT.

In an embodiment, the driving controller 200 may compensate for the data voltage VDATA written in the second area A2 based on the compensation grayscale CG. For example, the driving controller 200 may add the compensation grayscale CG corresponding to the compensation voltage CV to the grayscale of the second area A2 to compensate for the data voltage VDATA written in the second area A2. In another example, as shown in FIG. 6, when the compensation grayscale CG is added to the grayscale of the second area A2, the data voltage VDATA of the second area A2 may be reduced by the compensation voltage CV.

Figure 9:
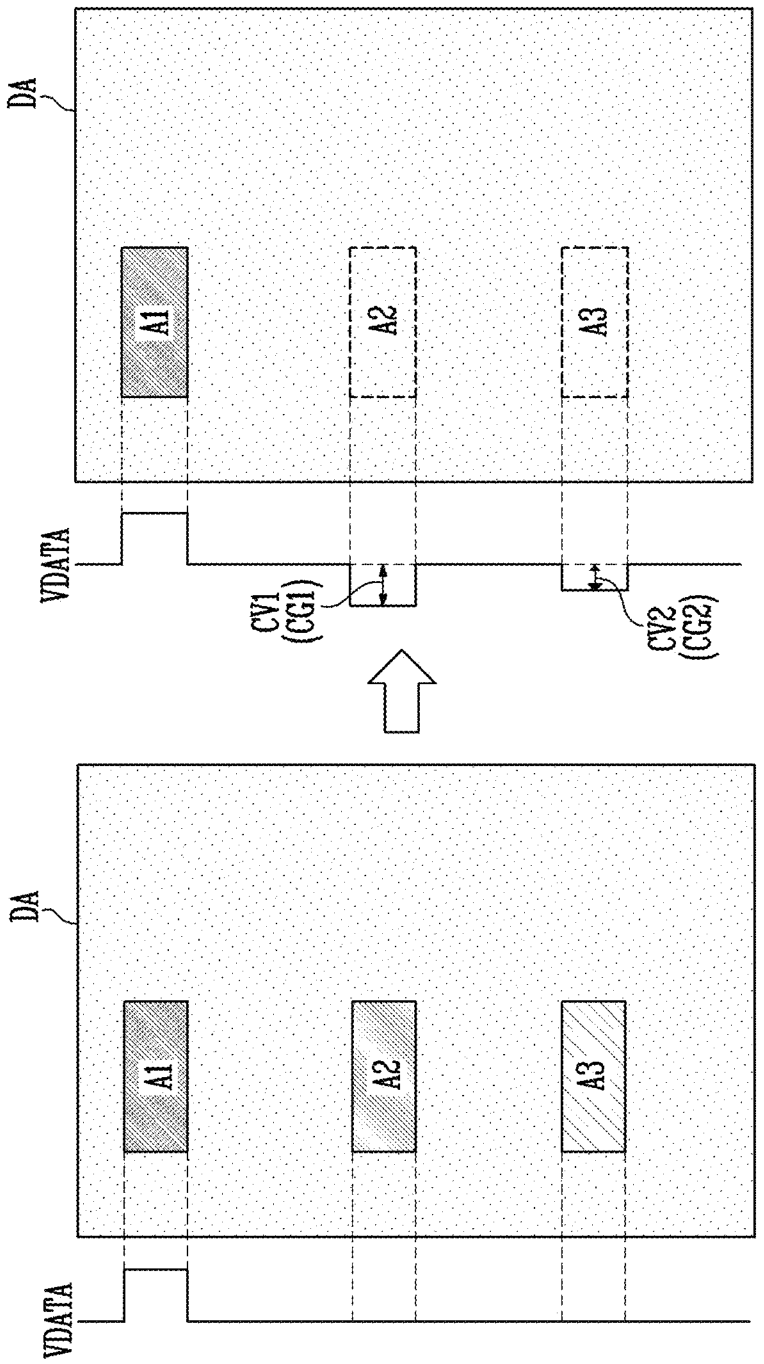
FIG. 9 illustrates a timing diagram of an example in which a display device compensates for a second area and a third area, according to an embodiment.
Figure 10:
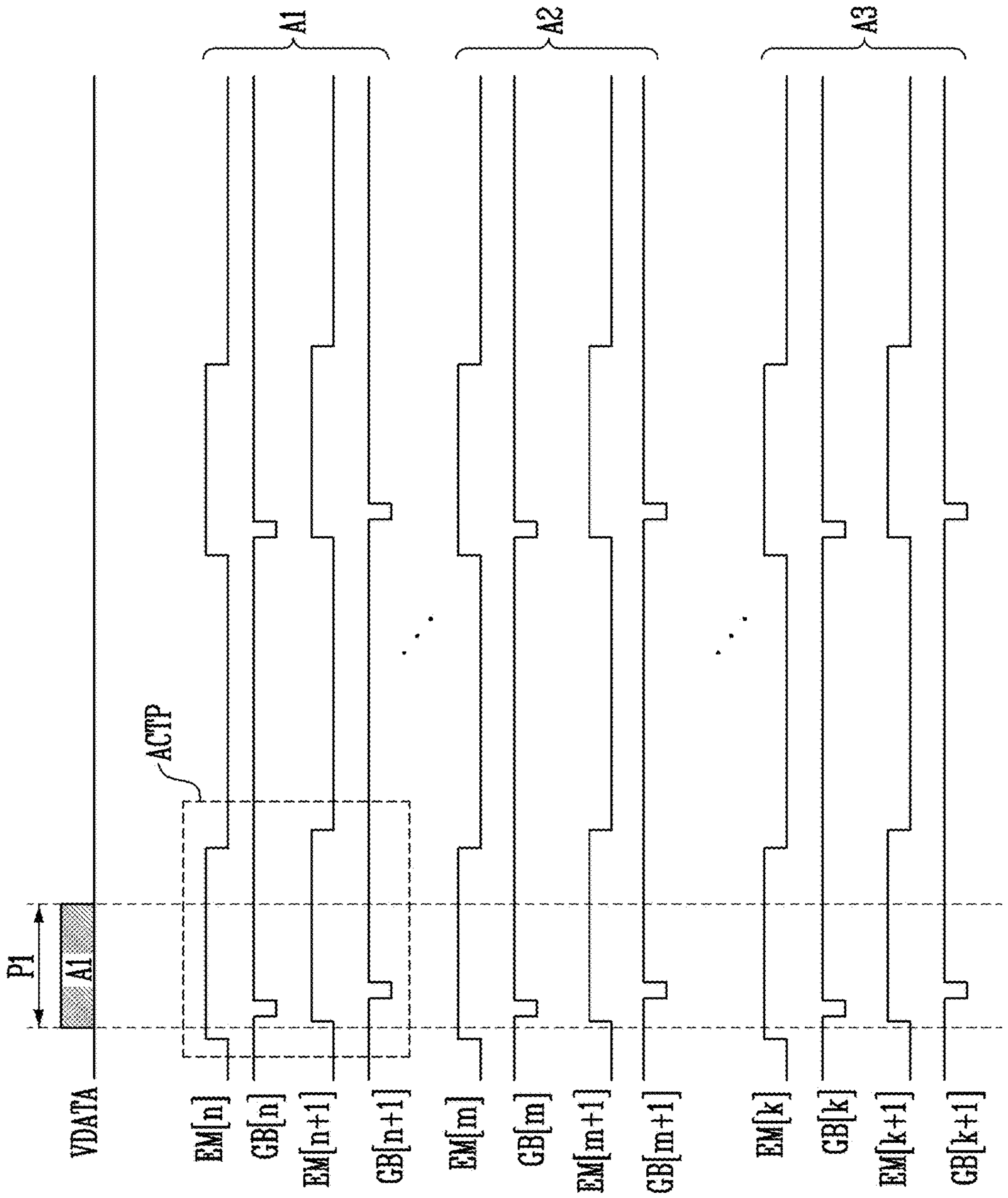
FIG. 10 illustrates a timing diagram of an example in which the display device of FIG. 9 drives the display panel in three cycles, according to an embodiment.
Figure 11:
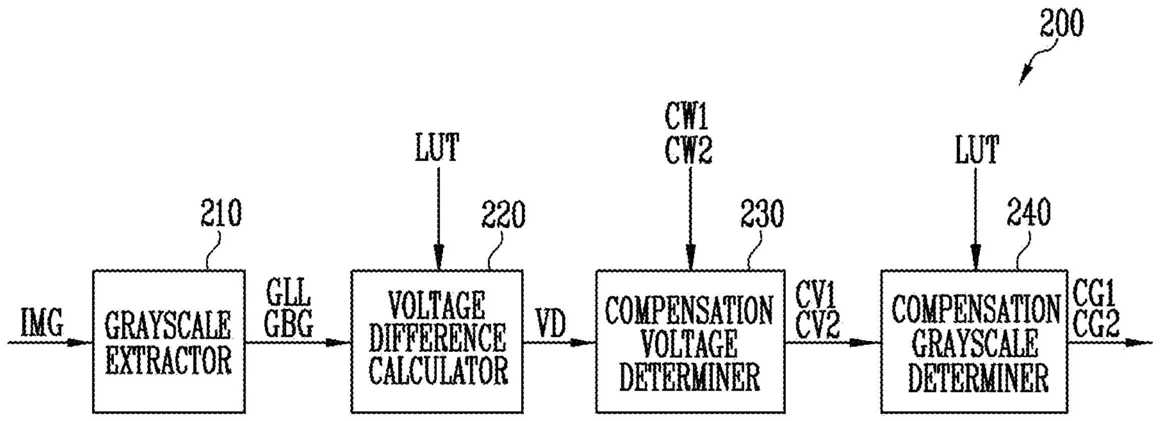
FIG. 11 illustrates a block diagram of an example of a driving controller of the display device of FIG. 9, according to an embodiment.

FIG. 9 illustrates an example in which a display device compensates for a second area and a third area, according to an embodiment, FIG. 10 illustrates a timing diagram of an example in which the display device of FIG. 9 drives the display panel in three cycles, according to an embodiment, and FIG. 11 illustrates a block diagram of an example of a driving controller of the display device of FIG. 9, according to an embodiment.

Since the display device according to an embodiment is substantially the same as the display device of FIG. 1, except for the 3 cycle driving, the same reference numerals and reference symbols are used for the same or similar constituent elements, and redundant descriptions are omitted.

In an embodiment, the left display area DA of FIG. 9 represents a case in which the data voltage VDATA is not compensated, and the right display area DA of FIG. 9 represents a case in which the data voltage VDATA is compensated.

In an embodiment, FIG. 10 illustrates that the first area A1 includes sub-pixels of n-th, (n+1)-th, and (n+2)-th pixel rows, the second area A2 includes sub-pixels of m-th, (m+1)-th, and (m+2)-th pixel rows, and the third area A3 includes sub-pixels of k-th, (k+1)-th, and (k+2)-th pixel rows. Here, n is a positive integer, m is a positive integer greater than n, and k is a positive integer greater than m. That is, the second area A2 may be closer to the first area A1 than the third area A3.

In an embodiment and referring to FIG. 9 and FIG. 10, the driving controller 200 may compensate for the data voltage VDATA written in the second area A2 and the third area A3 to which a bias gate signal (for example, GB[m], GB[m+1], GB[m+2], GB[k], GB[k+1], and GB[k+2]) having an activation level in the first period P1 in which the data voltage VDATA is written in the first area A1 is applied based on the first data voltage and the second data voltage.

In an embodiment, when the display device drives the display panel in 3 cycles, an area in which two luminance decreases may occur. Here, 3 cycle driving means that three areas of the display area DA display different sub-frames. In this case, the deactivation timing of the bias gate signals (GB[n], GB[n+1], GB[n+2], . . . , GB[m], GB[m+1], GB[m+2]) and the inactivation timing of the emission signals (GB[n], GB[n+1], GB[n+2], . . . , GB[m], GB[m+1], GB[m+2]) may overlap the three areas.

In an embodiment and referring to FIG. 2 and FIG. 9 to FIG. 11, the compensation voltage determiner 230 may apply the first capacitance weight CW1 to the difference VD between the first data voltage and the second data voltage to determine a first compensation voltage CV1. For example, the first compensation voltage CV1 may be a product of the difference VD between the first data voltage and the second data voltage and a first capacitance weight CW1. The compensation voltage determiner 230 may determine a second compensation voltage CV2 by applying a second capacitance weight CW2 to the difference VD between the first data voltage and the second data voltage. For example, the second compensation voltage CV2 may be a product of the difference VD between the first data voltage and the second data voltage and the second capacitance weight CW2.

In an embodiment, the capacitance weights CW1 and CW2 may be determined based on capacitance (that is, the capacitance of the first parasitic capacitor CP1) between the first electrode (that is, the anode electrode) of the light emitting element EE and the data line DL and the internal capacitance of the light emitting element EE (that is, capacitance of the internal capacitor CE of the light emitting element EE). For example, the capacitance weights CW1 and CW2 may increase as the capacitance between the first electrode of the light emitting element EE and the data line DL increases, and may decrease as the internal capacitance of the light emitting element EE increases.

In an embodiment, the capacitance weights CW1 and CW2 may be determined based on the capacitance (that is, the capacitance of the second parasitic capacitor CP2) between the first electrode of the first transistor T1 (that is, the driving transistor) and the data line DL and the capacitance of the storage capacitor CST. For example, the capacitance weights CW1 and CW2 may increase as the capacitance between the first electrode of the first transistor T1 and the data line DL increases, and may decrease as the capacitance of the storage capacitor CST increases. In an embodiment, the capacitance weights CW1 and CW2 may decrease as the capacitance of the first electrode of the first transistor T1 excluding the capacitance between the first electrode of the first transistor T1 and the data line DL increases.

In an embodiment, the second area A2 may be closer to the first area A1 than the third area A3. Accordingly, the decrease in luminance in the second area A2 may be greater than the decrease in luminance in the third area A3. Accordingly, the first capacitance weight CW1 may be greater than the second capacitance weight CW2, and the first compensation voltage CV1 may be greater than the second compensation voltage CV2.

In an embodiment, the compensation grayscale determiner 240 may determine compensation grayscale CG1 and CG2 based on the compensation voltages CV1 and CV2. For example, the compensation grayscale determiner 240 may determine a grayscale corresponding to the first compensation voltage CV1 as the first compensation grayscale CG1 by using the lookup table LUT. In another example, the compensation grayscale determiner 240 may determine a grayscale corresponding to the second compensation voltage CV2 as the second compensation grayscale CG2 by using the lookup table LUT.

In an embodiment, the driving first controller 200 may compensate for the data voltage VDATA written in the second area A2 based on the first compensation grayscale CG1. For example, the driving first controller 200 may add the first compensation grayscale CG1 corresponding to the first compensation voltage CV1 to the grayscale of the second area A2 to compensate for the data voltage VDATA written in the second area A2. For example, as shown in FIG. 9, when the first compensation grayscale CG1 is added to the grayscale of the second area A2, the data voltage VDATA of the second area A2 may be reduced by the first compensation voltage CV1.

In an embodiment, the driving first controller 200 may compensate for the data voltage VDATA written in the third area A3 based on the second compensation grayscale CG2. For example, the driving first controller 200 may add the second compensation grayscale CG2 corresponding to the second compensation voltage CV2 to the grayscale of the third area A3 to compensate for the data voltage VDATA written in the third area A3. For example, as shown in FIG. 9, when the second compensation grayscale CG2 is added to the grayscale of the third area A3, the data voltage VDATA of the third area A3 may be reduced by the second compensation voltage CV2.

In an embodiment, it is exemplified that the display panel 100 is driven in 3 cycles, but the invention is not limited to the number of cycles.

Figure 12:
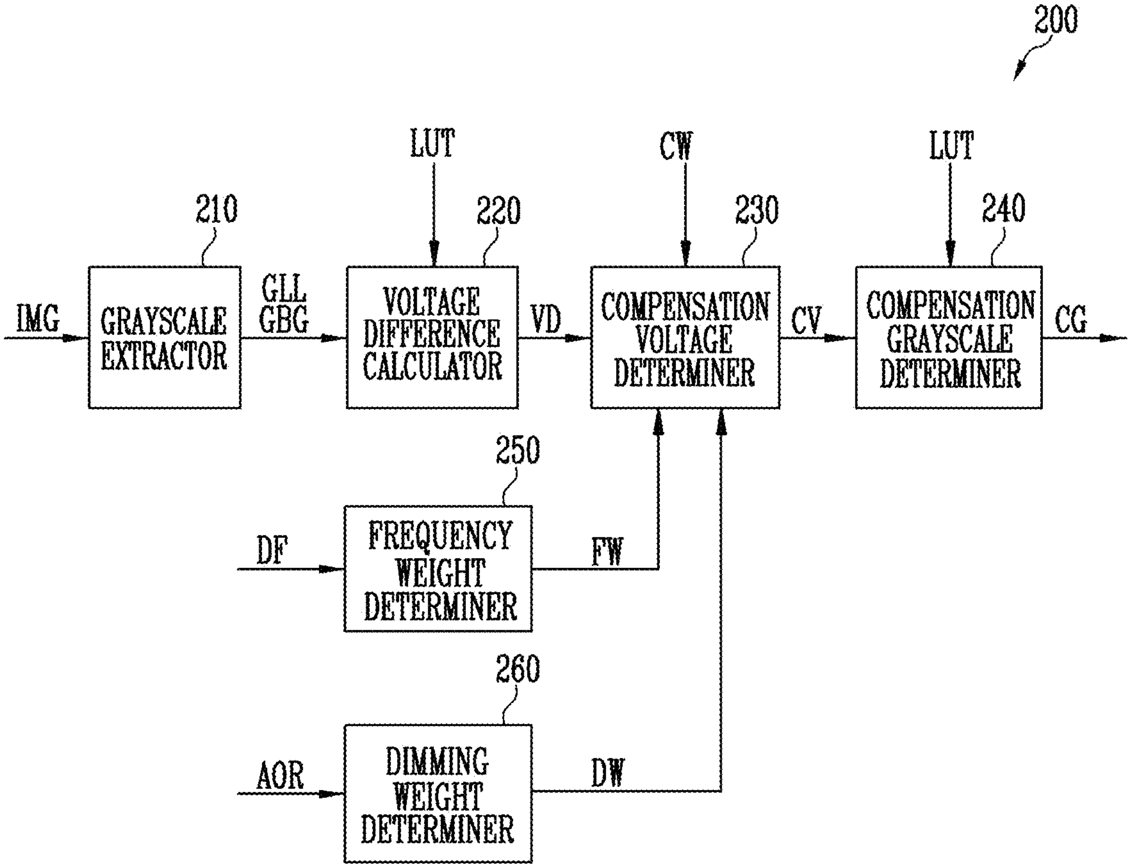
FIG. 12 illustrates a block diagram of a driving controller of a display device, according to an embodiment.

FIG. 12 illustrates a block diagram of a driving controller of a display device, according to an embodiment.

In an embodiment, since the display device is substantially the same as the configuration of the display device in FIG. 1, except for a frequency weight FW and a dimming weight DW, the same reference numbers and reference symbols are used for the same or similar constituent elements. and duplicate descriptions are omitted.

In an embodiment and referring to FIG. 2 and FIG. 12, the compensation voltage determiner 230 may determine the compensation voltage CV based on the difference VD between the first data voltage and the second data voltage. The compensation voltage determiner 230 may determine the compensation voltage CV by applying the weights CW, FW, and DW to the difference VD between the first data voltage and the second data voltage. For example, the compensation voltage CV may be a product of the difference VD between the first data voltage and the second data voltage and the weights CW, FW, and DW.

In an embodiment, it is described that the weights CW, FW, and DW include all of the capacitance weight CW, the frequency weight FW, and the dimming weight DW, and that the invention is not limited thereto. For example, the compensation voltage determiner 230 may determine the compensation voltage CV by applying at least one of the capacitance weight CW, the frequency weight FW, and the dimming weight DW.

In an embodiment, the weights CW, FW, and DW may include the capacitance weight CW, the frequency weight FW, and the dimming weight DW. The capacitance weight CW may be substantially the same as the weight described with reference to FIG. 6 to FIG. 8.

In an embodiment, the driving controller 200 may further include a frequency weight determiner 250 and a dimming weight determiner 260.

In an embodiment, the frequency weight determiner 250 may determine the frequency weight FW based on a driving frequency DF of the display panel. As the driving frequency DF increases, luminance reduction may increase. Accordingly, the frequency weight FW may increase as the driving frequency increases.

In an embodiment, the dimming weight determiner 260 may determine the dimming weight DW based on an off duty ratio AOR of the emission signal EM[n]. As the off duty ratio AOR of the emission signal EM[n] increases, the luminance reduction may increase. Accordingly, the dimming weight DW may increase as the off-duty ratio of the emission signal EM[n] increases.

Figure 13:
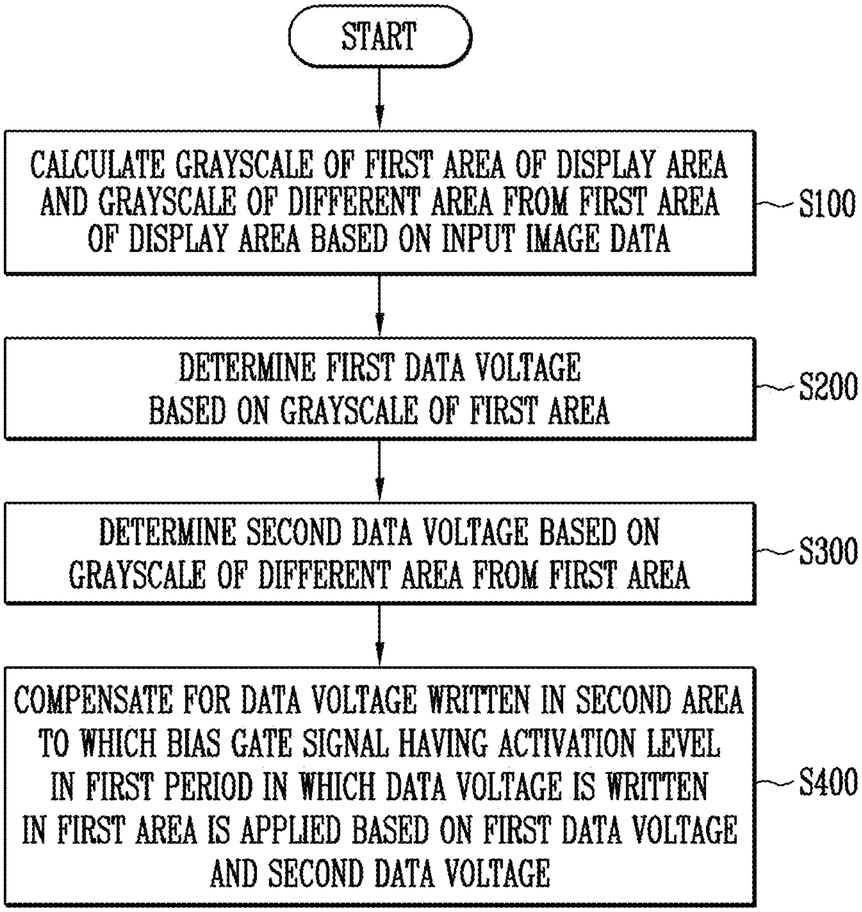
FIG. 13 illustrates a flowchart of a driving method of a display device, according to an embodiment.

FIG. 13 illustrates a flowchart of a driving method of a display device, according to an embodiment.

In an embodiment and referring to FIG. 13, the driving method of the display device may include calculating the grayscale of the first area of the display area and the grayscale of the different area from the first area of the display area based on the input image data (S100), determining the first data voltage based on the grayscale of the first area (S200), determining the second data voltage based on the grayscale of the different area from the first area (S300) and compensating for the data voltage written in the second area to which the bias gate signal having the activation level in the first period in which the data voltage is written in the first area is applied based on the first data voltage and the second data voltage (S400). Step S100 to step S400 may be implemented through the display device of FIG. 1.

Figure 14:
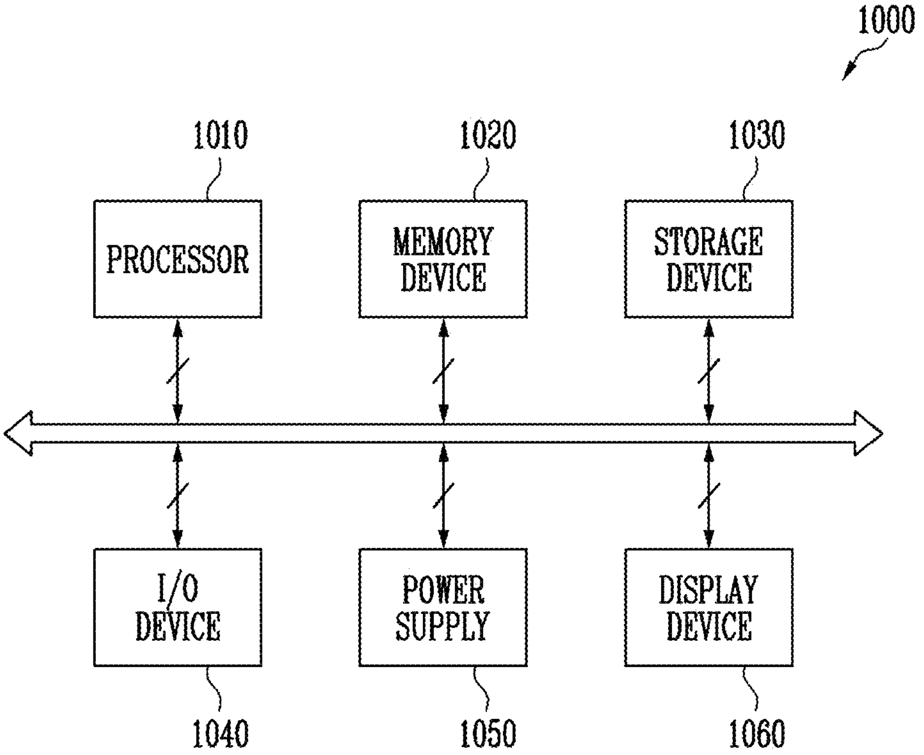
FIG. 14 illustrates a block diagram of an electronic device, according to an embodiment.
Figure 15:
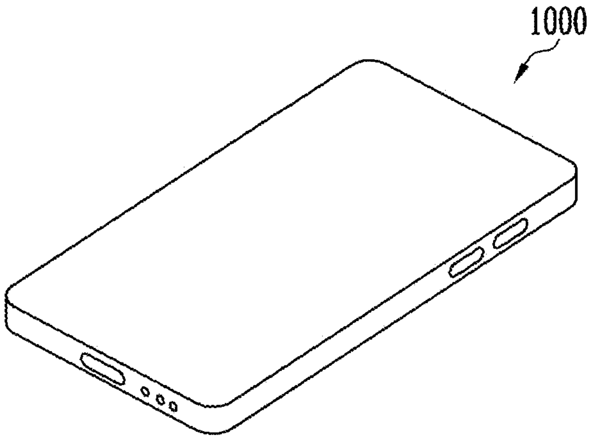
FIG. 15 illustrates an embodiment in which the electronic device of FIG. 14 is implemented as a smart phone.

FIG. 14 illustrates a block diagram of an electronic device, according to an embodiment, and FIG. 15 illustrates an example in which the electronic device of FIG. 14 is implemented as a smart phone, according to an embodiment.

In an embodiment and referring to FIG. 14 and FIG. 15, an electronic device 1000 may include a processor 1010, a memory device 1020, a storage device 1030, an input/output device 1040, a power supply device 1050, and a display device 1060. In this case, the display device 1060 may be the display device of FIG. 1. In addition, the electronic device 1000 may further include several ports capable of communicating with a video card, a sound card, a memory card, a USB device, and the like, or communicating with other systems. In an embodiment, as shown in FIG. 15, the electronic device 1000 may be implemented as a smart phone. However, this is an example, and the electronic device 1000 is not limited thereto. For example, the electronic device 1000 may be implemented as a mobile phone, a video phone, a smart pad, a smart watch, a tablet PC, a vehicle navigation, a computer monitor, a laptop, a head mounted display device, or the like.

In an embodiment, the processor 1010 may perform specific calculations or tasks. In some embodiments, the processor 1010 may be a micro-processor, a central processing unit, an application processor, or the like. The processor 1010 may be connected to other constituent elements through an address bus, a control bus, and a data bus. In some embodiments, the processor 1010 may also be connected to an extension bus such as a peripheral component interconnect (PCI) bus.

In an embodiment, the memory device 1020 may store data necessary for operations of the electronic device 1000. For example, the memory device 1020 may include nonvolatile memory devices such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, and/or volatile memory devices such as a dynamic random access memory (DRAM) device, a static random access memory (SRAM) device, and a mobile DRAM device.

In an embodiment, the storage device 1030 may include a solid state drive (SSD), a hard disk drive (HDD), a CD-ROM, and the like.

In an embodiment, the input/output device 1040 may include input devices such as a keyboard, a keypad, a touch pad, a touchscreen, mouse, and the like, and output devices such as a speaker, a printer, and the like. In some embodiments, the display device 1060 may be included in the input/output device 1040.

In an embodiment, the power supply device 1050 may supply power necessary for the operation of the electronic device 1000. For example, the power supply device 1050 may be a power management integrated circuit (PMIC).

In an embodiment, the display device 1060 may display an image corresponding to visual information of the electronic device 1000. In this case, the display device 1060 may be an organic light emitting display device or a quantum dot light emitting display device, but is not limited thereto. The display device 1060 may be connected to other constituent elements through the buses or other communication links.

In an embodiment, the invention may be applied to a display device and an electronic device including the same. For example, the invention may be applied to a digital TV, a 3D TV, a mobile phone, a smart phone, a tablet computer, a VR device, a PC, a home electronic device, a laptop computer, a PDA, a PMP, a digital camera, a music player, a portable game console, a navigation, and the like.

While the invention has been particularly shown and described with reference to embodiments thereof, it will be understood by those of ordinary skill in the art that various changes in form and details may be made therein without departing from the spirit or scope of the invention. Therefore, it is to be understood that the foregoing is illustrative of various embodiments and is not to be construed as limited to the specific embodiments disclosed, and that modifications to the invention, are intended to be included within the scope of the invention. Moreover, the embodiments or parts of the embodiments may be combined in whole or in part without departing from the scope of the invention.

What is claimed is:

1. A display device comprising:

a display panel including a display area including sub-pixels;

a data driver providing a data voltage to each of the sub-pixels through a data line;

a gate driver providing a bias gate signal to each of the sub-pixels; and a driving controller compensating for the data voltage written in a second area to which the bias gate signal having an activation level in a first period in which the data voltage is written in the first area is applied based on a first data voltage corresponding to a grayscale of a first area of the display area and a second data voltage corresponding to a grayscale of a different area of the first area of the display area.

2. The display device of claim 1, wherein a difference between the grayscale of the first area and the grayscale of the different area of the first area is greater than a reference grayscale.

3. The display device of claim 1, wherein the driving controller compensates for the data voltage written in the second area based on a difference between the first data voltage and the second data voltage.

4. The display device of claim 3, wherein the driving controller determines a compensation voltage by applying a weight to the difference between the first data voltage and the second data voltage, and compensates for the data voltage written in the second area based on the compensation voltage.

5. The display device of claim 4, wherein each of the sub-pixels includes a light emitting element, and the weight is determined based on capacitance between an anode electrode of the light emitting element and the data line and an internal capacitance of the light emitting element.

6. The display device of claim 5, wherein the weight increases as the capacitance between the anode electrode of the light emitting element and the data line increases, and decreases as the internal capacitance of the light emitting element increases.

7. The display device of claim 4, wherein each of the sub-pixels includes a driving transistor and a storage capacitor, and the weight is determined based on capacitance between a first electrode of the driving transistor and the data line and a capacitance of the storage capacitor.

8. The display device of claim 7, wherein the weight increases as the capacitance between the first electrode of the driving transistor and the data line increases, and decreases as the capacitance of the storage capacitor increases.

9. The display device of claim 4, wherein the weight increases as a driving frequency of the display panel increases.

10. The display device of claim 4, further comprising an emission driver providing an emission signal to each of the sub-pixels, wherein the weight increases as an off duty ratio of the emission signal increases.

11. The display device of claim 4, wherein the driving controller compensates for the data voltage written in the second area by adding a compensation grayscale corresponding to the compensation voltage to a grayscale of the second area.

12. The display device of claim 1, wherein the driving controller compensates for the data voltage written in a third area that is different from the second area and to which the bias gate signal having the activation level in the first period is applied.

13. The display device of claim 12, wherein the driving controller generates a first compensation voltage by applying a first weight to a difference between the first data voltage and the second data voltage, compensates for the data voltage written in the second area based on the first compensation voltage, generates a second compensation voltage by applying a second weight to the difference between the first data voltage and the second data voltage, and compensates for the data voltage written in the third area based on the second compensation voltage.

14. The display device of claim 13, wherein
the second area is closer to the first area than the third area, and
the first compensation voltage is greater than the second compensation voltage.

15. A driving method of a display device, comprising:
calculating a grayscale of a first area of a display area and a grayscale of a different area of the first area of the display area based on an input image data;
determining a first data voltage based on the grayscale of the first area;
determining a second data voltage based on the grayscale of the different area of the first area; and
compensating for the data voltage written in a second area to which a bias gate signal having an activation level in a first period in which a data voltage is written in the first area is applied based on the first data voltage and the second data voltage.

16. The driving method of claim 15, wherein
the first data voltage and the second data voltage are determined based on a lookup table, wherein the lookup table includes the data voltage according to a grayscale.

17. The driving method of claim 15, wherein
a difference between the grayscale of the first area and the grayscale of the different area of the first area is greater than a reference grayscale.

18. The driving method of claim 15, wherein
the data voltage written in the second area is compensated based on a difference between the first data voltage and the second data voltage.

19. The driving method of claim 18, wherein
the compensating of the data voltage written in the second area includes,
determining a compensation voltage by applying a weight to the difference between the first data voltage and the second data voltage, and
compensating for the data voltage written in the second area based on the compensation voltage.

20. The driving method of the display device of claim 19, wherein
the data voltage written in the second area is compensated by adding a compensation grayscale corresponding to the compensation voltage to the grayscale of the second area.

* * * * *